No. 876,164.

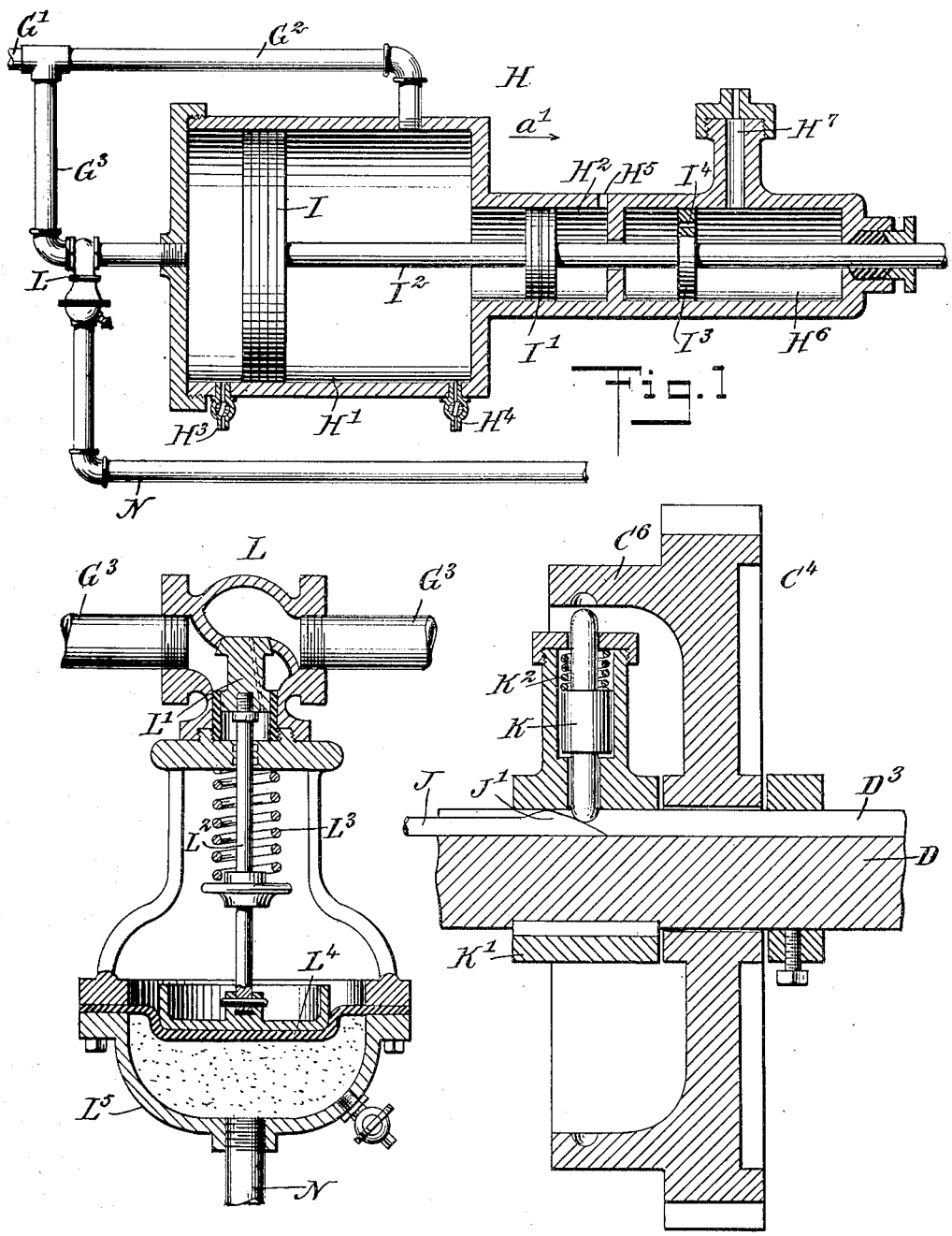

PATENTED JAN. 7, 1908.

T. B. FORD.
AUTOMATIC CONTROLLER FOR THE SPEED OF AUTOVEHICLES.
APPLICATION FILED MAR. 28, 1906.

2 SHEETS—SHEET 2.

WITNESSES

INVENTOR
Thomas B. Ford
BY
ATTORNEYS

UNITED STATES PATENT OFFICE.

THOMAS BURTON FORD, OF NEW YORK, N. Y.

AUTOMATIC CONTROLLER FOR THE SPEED OF AUTOVEHICLES.

No. 876,164.  Specification of Letters Patent.  Patented Jan. 7, 1908.

Application filed March 28, 1906. Serial No. 308,487.

*To all whom it may concern:*

Be it known that I, THOMAS B. FORD, a citizen of the United States, and a resident of the city of New York, Far Rockaway, borough of Queens, in the county of Queens and State of New York, have invented a new and Improved Automatic Controller for the Speed of Autovehicles, of which the following is a full, clear, and exact description.

The object of the invention is to provide a new and improved automatic controller for the speed of autovehicles, arranged to automatically actuate the gear shifter of the vehicle and establish a given ratio between the normal speed of the motor and the speed of the driven traction wheels of the vehicle, and when this ratio is disturbed by an increase or decrease in the speed of the driven traction wheels then the controller shifts the gear to another ratio, which allows the motor to run at its normal speed although an increase or decrease of the speed of the traction wheels takes place.

The invention consists of novel features and parts and combinations of the same which will be more fully described hereinafter and then pointed out in the claims.

A practical embodiment of the invention is represented in the accompanying drawings forming a part of this specification, in which similar characters of reference indicate corresponding parts in all views.

Figure 4:
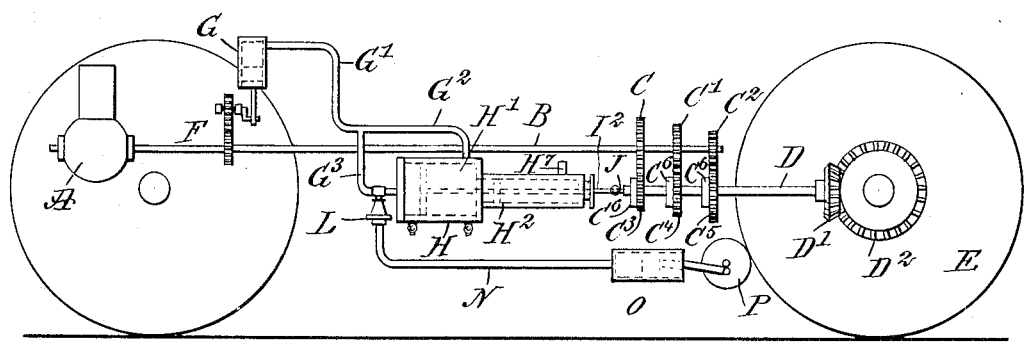
Figure 5:
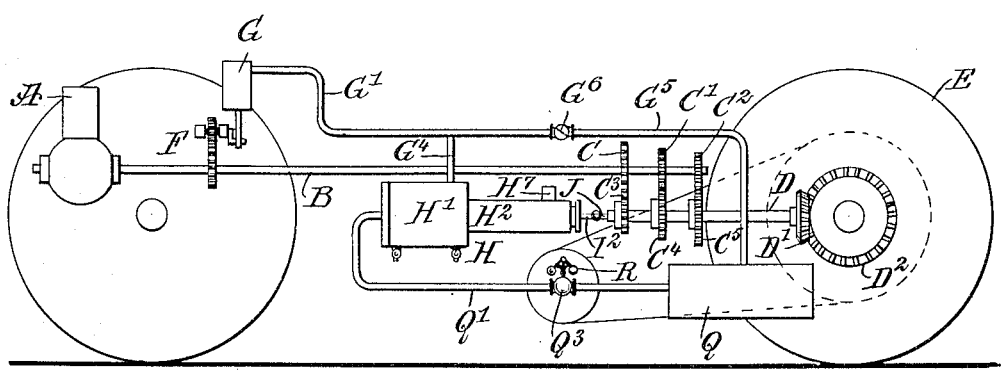

Figure 1 is an enlarged sectional side elevation of the improvement; Fig. 2 is an enlarged sectional side elevation of the reducing valve; Fig. 3 is an enlarged sectional side elevation of the shifting gear; Fig. 4 is a side elevation of the improvement as applied, and Fig. 5 is a like view of a modified form of the same.

The motor A of an autovehicle of any approved construction has its driven shaft B provided with a number of different sized gear wheels C, C', $C^2$ in mesh with gear wheels $C^3$, $C^4$, $C^5$, mounted to rotate loosely on a shaft D carrying a bevel gear wheel D' in mesh with a bevel gear wheel $D^2$ secured on the axle of the driven traction wheels E of the vehicle. The motor shaft B is connected by a gearing F with the shaft of an air pump G having its discharge pipe G' provided with two branch pipes $G^2$, $G^3$ connecting with a cylinder H, attached to the vehicle, and provided with two bores H' and $H^2$ of different diameters and containing pistons I and I', both secured to a common piston rod $I^2$ coupled at its outer end to a gear shifter J mounted to slide longitudinally in a groove $D^3$ formed on the shaft D above referred to. The gear shifter J is provided at its terminal with an incline J' adapted to engage a clutch pin K mounted to slide in a casing K' secured to the shaft D, see Fig. 3. The clutch pin K is pressed on by a spring $K^2$ and is adapted to engage a clutch member $C^6$ formed on each of the gear wheels $C^3$, $C^4$ and $C^5$.

When the motor is running and the clutch pin K is moved outward by the incline J' into engagement with the clutch member $C^6$ of the gear wheel $C^4$, the shaft B of the motor, by the gear wheels C', $C^4$, and the clutch pin K rotates the shaft D, which by the gear wheels D', $D^2$, turns the traction wheels E. When the intermediate gear wheels C', $C^4$, are in operation, a given ratio is established between the normal speed of the motor and the speed of the driven traction wheels.

When the shifter J is moved lengthwise in the groove $D^3$ to engage either of the clutch pins K for the gear wheels $C^3$, $C^5$, then the shaft D is driven at a higher or lower speed, the motor A when driving through either of said gears $C^3$, $C^4$ or $C^5$, running at a normal predetermined rate of speed.

The branch pipe $G^2$ of the discharge pipe G' leading from the air pump G opens into the larger bore H' of the cylinder H at a point next to the bore $H^2$, and the branch pipe $G^3$ opens into the outer end of the large bore H', as plainly indicated in the drawings. In the branch pipe $G^3$ is arranged a pressure controlling valve L having a piston valve L', provided with a valve stem $L^2$, pressed on by a spring $L^3$ to normally hold the piston valve L' in an open position. The piston rod $L^2$ is connected with a diaphragm $L^4$ held in a casing $L^5$ connected by a pipe N with an air pump O driven by a suitable gear P from the traction wheel E, as plainly illustrated in Fig. 4. The casing $L^5$ is provided with the usual relief valve, as shown in Figs. 1 and 2. The large bore $H^1$ of the cylinder H is provided with leak valves $H^3$, $H^4$ on opposite sides of the piston I and adapted to be set by the operator to allow a predetermined amount of air to escape from the bore H' of the cylinder H. The outer end of the bore $H^2$ is provided with an air opening $H^5$. On the piston rod $I^2$ is secured a piston $I^3$ moving in a dash-pot $H^6$, preferably forming an integral part of the cylinder H adjacent to the bore $H^2$, and in the piston $I^3$ is arranged an aperture $I^4$ to allow air, oil or other fluid contained in the dash pot H⁶ to flow from one side of the piston I³ to the other side thereof, whenever the pistons I and I' are shifted, as hereinafter more fully explained. The dash pot H⁶ is provided with a connection H⁷ to the atmosphere.

The operation is as follows. The motor A, such as a gasolene engine, for instance, is run at a uniform predetermined speed. Now assume that the vehicle is going up a hill and the engine driving through the low speed gears C², C⁵. When the level ground is reached, there being less friction to overcome the traction wheels turn faster and throw the intermediate gears C', C⁴ into operation. On a further forward movement on the level the speed of the traction wheel is raised by the intermediate gears and the air pump O pumps more air against the diaphragm L⁴ so that the valve L' is moved nearly into a complete closed position to shut off the pressure in the outer end of the large bore H' of the cylinder H, so that the preponderance of pressure against the pistons I and I' by way of the branch pipe G² causes a movement of the pistons I and I' toward the left, to move the incline J' of the shifter J in engagement with the clutch pin K of the clutch member C⁶ of the gear wheel C³, to connect the latter with the shaft D, and consequently the shaft D is rotated at a high rate of speed from the motor shaft B without increasing the speed of the motor A.

When the vehicle runs down a hill it moves more rapidly owing to the force of gravity added to the power of the engine. On a level under the normal speed of the engine, the run is finally made by the high-speed gears. When the resistance to be overcome increases to a certain extent, the traction wheels turn slower, the air-pressure against the diaphragm L⁴ decreases, and the valve L' opens to admit sufficient pressure to the outer end of the bore H' of the cylinder H to throw the intermediate gears C', C⁴ into operation. On a further increase in the friction, as in going up a hill, the traction wheels E in rotating slower, force the air pump O to pump less air in a given time against the diaphragm L⁴, so that the valve L' opens wider, and consequently more air passes from the air pump G through the branch pipe G³ into the outer end of the large bore H', to cause the piston I and with it the piston I' to be shifted in the direction of the arrow a', whereby the incline J' of the shifter J moves out of engagement with the clutch pin K of the gear wheel C⁴ and moves into engagement with the clutch pin K of the gear wheel C⁵ to connect the latter with the shaft D, so that the latter shaft is now rotated from the motor shaft B by way of the gear wheels C², C⁵, and the said clutch mechanism. Now when this takes place, the traction wheels E are driven with more force without change in the normal speed of the motor A.

It is understood that the air pressure passing into the bore H' by way of the branch pipe G², not only acts against the inner face of the piston I but also acts against the face of the piston I', and consequently the pressure for shifting the pistons I, I' in the direction of the arrow a' is considerably less than the pressure exerted against the outer face of the piston I by the air entering the outer end of the bore H' by way of the branch pipe G³. Now, when a reduction of the pressure admitted into the outer end of the bore H' takes place by shifting the piston valve L' into a nearly closed position, as above described, then the pistons I and I' travel in the inverse direction of the arrow a', and when the valve L' is opened further and an increase of pressure in the outer end of the bore H' takes place, then the pistons I, I' are shifted in the direction of the arrow a'.

From the foregoing it will be seen that by the arrangement described the variation of pressure in the outer end of the bore H' of the cylinder H is controlled solely from the traction wheels E, and consequently the motor A is free to run at a predetermined speed, and the motor A can thus operate to its fullest advantage at all times.

A too sudden change in the position of the pistons I and I' is prevented by the use of the dash pot arrangement H⁶, I³ to insure a gradual change in the speed of the driven traction wheels E.

I do not limit myself to the detailed description shown and above described as the same may be varied. For instance, as illustrated in Fig. 5, the air pump O and its driving mechanism P is dispensed with, and instead an air reservoir Q is provided, connected by a branch pipe G⁵ with the discharge pipe G' of the pump G, which discharge pipe G' has a pipe G⁴ leading to the large bore H' of the cylinder H. The reservoir Q is connected by a pipe Q' with the outer end of the large bore H' of the cylinder H, and in this pipe Q' is arranged a reducing valve Q³ controlled by a governor R driven from the traction wheels E. The branch pipe G⁵ is provided with a check valve G⁶, otherwise, the construction is the same as above described in reference to Figs. 1 to 4, and the operation is similar, the only difference being that the air entering the outer end of the bore H' of the cylinder H is furnished by the pump G, but the amount of this air admitted to the outer end of the bore H' is controlled by the reducing valve Q³ actuated from the traction wheels E. Thus the action of the valve Q³ is the same as that of the valve L, that is, to throttle the air pressure passing into the outer end of the bore H' according to the speed of the traction wheels E.

It is well known that a gasolene or other explosive motor is the most efficient when run at full normal speed and as long as the motor is running this speed when disturbed, as in going up or running down a hill, is automatically restored from the traction wheels E, as a lower or higher speed of the traction wheels causes a change to take place in the power transmission, that is, at the gearing C, $C^3$; $C'$, $C^4$; and $C^2$, $C^5$, so that the motor runs at its normal speed.

Having thus described my invention, I claim as new and desire to secure by Letters Patent:

1. An automatic controller for the speed of autovehicles comprising the motor, the traction wheels, and a shifting device having a pneumatic actuator controlled by the combined action of the motor, running at a uniform rate of speed, and the driven traction wheels running at a varying rate of speed.

2. An automatic controller for the speed of autovehicles, comprising the motor, the traction wheels, a shifting device for controlling the transmission of power from the motor to the traction wheels, and an automatically controlled pressure device for actuating the said shifting device.

3. An automatic controller for the speed of autovehicles, comprising the motor, the traction wheels, a shifting device for controlling the transmission of power from the motor to the traction wheels, a pressure device for actuating the said shifting device, and means for controlling the said pressure device from the traction wheels.

4. An automatic controller for the speed of autovehicles, comprising the motor, the traction wheels, a series of gearings for imparting different speeds respectively to the traction wheels, a shifter for controlling said gearings and normally maintaining a given ratio of speed between the motor and the traction wheels, a pressure device for actuating said shifter to change the ratio of speed between the normal speed of the motor and the varying speed of the traction wheels, the said pressure device being controlled by a reduction or increase of the speed of the traction wheels.

5. An automatic controller for the speed of autovehicles comprising the motor, the traction wheels, a shifter for controlling the transmission of power from the motor to the traction wheels, and a pressure device having a cylinder provided with connected bores of different diameters, pistons in the said bores, and having a common piston rod connected with the said shifter, and means for delivering pressure to the said cylinder, and controlled by the motor and the traction wheels of the vehicle.

6. An automatic controller for the speed of autovehicles comprising the motor, the traction wheels, a shifter for controlling the transmission of power from the motor to the traction wheels, and a pressure device comprising a cylinder having connected bores of different diameters, pistons in the said bores, and having a common piston rod connected with the said shifter, an air pump actuated by the motor and having connections with the said cylinder, one at the outer end of the larger bore and another between the two bores, and a valve in the connection to the outer end of the larger cylinder and controlled by the traction wheels.

7. An automatic controller for the speed of autovehicles comprising the motor, the traction wheels, a shifter for controlling the transmission of power from the motor to the traction wheels, a pressure device comprising a cylinder having connected bores of different diameters, pistons in the said bores, and having a common piston rod connected with the said shifter, an air pump actuated by the motor and discharging into the said cylinder at the outer end of the larger bore and between the said bores, a pressure controlling valve in the connection to the outer end of the larger bore, and means controlled from the traction wheels and controlling the said pressure controlling valve.

8. An automatic controller for the speed of autovehicles comprising the motor, the traction wheels, a shifter for controlling the transmission of power from the motor to the traction wheels, a pressure device comprising a cylinder having connected bores of different diameters, pistons in the said bores, and having a common piston rod connected with the said shifter, an air pump actuated by the motor and discharging into the said cylinder at the outer end of the larger bore and between the said bores, a pressure controlling valve in the connections, and an air pump actuated from the traction wheels and controlling the said pressure controlling valve.

9. In a self-propelled vehicle, a prime mover, speed-changing gearing for varying the relative speeds of the prime mover and the driving wheels of the vehicle, a pressure-generating device mechanically connected to the driving wheels, and means responsive to variations in the pressure generated in said device controlling said gearing.

In testimony whereof I have signed my name to this specification in the presence of two subscribing witnesses.

THOMAS BURTON FORD.

Witnesses:
  THEO. G. HOSTER,
  EVERARD B. MARSHALL.